(12) United States Patent
Stupakis

(10) Patent No.: US 9,840,326 B2
(45) Date of Patent: Dec. 12, 2017

(54) UNMANNED AIRCRAFT SYSTEMS FOR FIREFIGHTING

(71) Applicant: John S. Stupakis, Hewitt, NJ (US)

(72) Inventor: John S. Stupakis, Hewitt, NJ (US)

(73) Assignee: BOXAIR ENGINEERING, LLC, Hewitt, NJ (US)

( * ) Notice: Subject to any disclaimer, the term of this patent is extended or adjusted under 35 U.S.C. 154(b) by 772 days.

(21) Appl. No.: 13/920,593

(22) Filed: Jun. 18, 2013

(65) Prior Publication Data

US 2014/0000917 A1  Jan. 2, 2014

Related U.S. Application Data

(60) Provisional application No. 61/661,204, filed on Jun. 18, 2012.

(51) Int. Cl.
*A62C 25/00* (2006.01)
*B64C 39/02* (2006.01)
(Continued)

(52) U.S. Cl.
CPC ............ *B64C 39/02* (2013.01); *A62C 3/0242* (2013.01); *B64C 39/024* (2013.01); *B64D 1/16* (2013.01)

(58) Field of Classification Search
CPC ......... B64C 39/02; B64C 39/024; B64D 1/16; A62C 3/0242
(Continued)

(56) References Cited

U.S. PATENT DOCUMENTS

| 2,008,202 | A |   | 7/1935 | Cullen et al. |
| 2,895,693 | A | * | 7/1959 | Portias ..................... B64D 1/16 244/136 |

(Continued)

FOREIGN PATENT DOCUMENTS

RU   2 401 684 C   10/2010

OTHER PUBLICATIONS

International Search Report and Written Opinion for PCT/US2013/046315 dated Nov. 8, 2013.

*Primary Examiner* — Arthur O Hall
*Assistant Examiner* — Joel Zhou
(74) *Attorney, Agent, or Firm* — Hoffmann & Baron, LLP

(57) ABSTRACT

A firefighting aircraft adapted for use in an unmanned aircraft system includes a storage tank for firefighting fluid, having a plurality of filling ports spaced from one another. A probe carries a conduit that is in fluid communication with the storage tank. The conduit receives water from a body of water overflown by the aircraft. A filling system for controls the flow of water to and from the storage tank, and includes a remotely and automatically operable valve respectively associated with each filling port. A control system is in communication with each valve, and is operative to command the position of each valve to regulate the flow of fluid through each filling port. A baffle may be further provided internal to the storage tank at least partially defining a first chamber within the tank. The baffle may include one or more baffles, and be provided substantially vertically, horizontally, parallel with or transverse to a longitudinal axis of the aircraft, or otherwise, and is operative to contain water entering the tank through the filling port, substantially filling the first chamber before filing any other portion of the storage tank.

11 Claims, 9 Drawing Sheets

(51) Int. Cl.
*A62C 3/02* (2006.01)
*B64D 1/16* (2006.01)

(58) Field of Classification Search
USPC .......................................................... 169/53
See application file for complete search history.

(56) References Cited

U.S. PATENT DOCUMENTS

| | | | |
|---|---|---|---|
| 3,442,334 A * | 5/1969 | Gousetis | B64D 1/16 169/53 |
| 3,714,987 A * | 2/1973 | Mattson | B64D 1/16 137/533.13 |
| 3,897,829 A * | 8/1975 | Eason | B64D 1/16 169/53 |
| 5,960,981 A | 10/1999 | Dodson et al. | |
| 6,644,595 B2 * | 11/2003 | Ramage | A62C 3/0228 169/53 |
| 6,769,493 B1 * | 8/2004 | Fima | A01C 7/085 169/51 |
| 2002/0084383 A1 | 7/2002 | Maeda | |
| 2007/0164162 A1 | 7/2007 | Olive et al. | |
| 2008/0029646 A1 * | 2/2008 | Von Mohos | B64D 1/16 244/129.1 |
| 2008/0099599 A1 * | 5/2008 | Hutterer | B64D 27/02 244/15 |
| 2011/0162742 A1 * | 7/2011 | Ulens | F24D 19/1015 137/624.27 |

* cited by examiner

UNMANNED AIRCRAFT SYSTEMS FOR FIREFIGHTING

CROSS-REFERENCE TO RELATED APPLICATION

The instant application claims the priority benefit under 35 U.S.C. §119(e) to prior U.S. Provisional Patent Application Ser. No. 61/661,204, filed 18 Jun. 2012 by the present inventor and entitled UNMANNED AIRCRAFT SYSTEMS FOR FIREFIGHTING. The complete disclosure and contents of this priority application is hereby incorporated in its entirety herein by this reference for all purposes.

BACKGROUND

Field of the Disclosure

The present invention relates to the field of aviation and, more particularly, to an uninhabited aircraft system (UAS) particularly adapted for aerial firefighting application.

Brief Discussion of Related Art

Aerial firefighting is particularly adapted to remote areas where urban infrastructure. One method of aerial firefighting involves dropping a large volume of water or fire-retardant material (e.g., foam, or the like, without limitation) in the area of the fire, and hoping that an effective portion of the dropped load would actually reach the base of the fire. For simplicity, "water" as used herein will include water, firefighting foam and/or chemicals in whatever form.

In practice, it is often the case that most of the water and/or foam does not reach the fire. Among the reasons for the ineffectiveness of many drops is that the pilots have not been able to go below a certain altitude with respect to the fire. Among the reasons for this is the risk to the pilots and their aircraft of flying too low over the fire. As a result, the pilot will drop the water from a higher altitude.

Furthermore, with the existing systems, pilots cannot adequately see the base of the fire, which is typically obscured by smoke. Therefore, their drops are less accurate. Therefore, a solution to the problem of creating an effective aerial firefighting platform is wanting.

SUMMARY OF THE DISCLOSURE

The presently disclosed firefighting UAS offers several key advantages. Initially, aerial firefighting is an inherently and intractably dangerous activity. Taking the pilot out of the aircraft with UAS technology, with no corresponding degradation in mission performance, is a priceless increase in safety.

Dropping fire-fighting material at a high rate is advantageous in fighting the fire. However, doing so carries the potential to shift the center of gravity (CG) of the aircraft and in so doing adversely affect the stability of the aircraft flight. The present aircraft in configured to on-load water from natural sources, lakes or rivers, where available. This eliminates the need to return to a base to refill with firefighting material, vastly increasing the efficiency and effectiveness of the vehicle in battling the blaze on scene. However, picking up water from a lake or from the sea is a risk-laden operation at best. Similar questions about aircraft stability exist. However, according to the present disclosure, the same valve system operating in a different mode, again controlled by the computer, regulates the pick-up with stability and efficiency in mind.

The UAS according to the present disclosure may be configured for autonomous and/or remotely piloted operation. In particular embodiments described herein the structure of the UAS aircraft may be assembled from the ground up, essentially on its own wheels. This minimizes or essentially eliminates the need for assembly jigs, and greatly speeds and reduces the cost of assembly.

Therefore, provided according to the present disclosure is a firefighting aircraft adapted for use in an unmanned aircraft system. The firefighting aircraft includes a storage tank for firefighting fluid, having a plurality of filling ports spaced from one another. A probe carries a conduit that is in fluid communication with the storage tank. The conduit being operative to receive water from a body of water overflown by the aircraft. A filling system for controls the flow of water to and from the storage tank, and includes a remotely and automatically operable valve respectively associated with each filling port. In some embodiments, the valves are controllable to regulate a rate of fluid flow there through. A control system is in communication with each valve, and operative to command the position of each valve to regulate the flow of fluid through each filling port.

According to a more particular embodiment of the present disclosure, a flow meter is associated with each valve operative to measure fluid flow through each valve. Each flow meter is in communication with the control system, and provides flow data to the control system. The control system uses the flow data from the flow meters to operate the valves and regulate the flow of fluid through each filling port.

According to a more particular embodiment of the present disclosure, the filling ports are spaced from one another along at least one of a longitudinal or lateral axis of the aircraft. Where the filling ports are arranged in an array, the array may be substantially centered on the center of gravity of the aircraft.

The firefighting aircraft may include a discharge gate for discharging fluid carried in the storage tank from the aircraft, and a manifold in fluid communication with the probe-carried conduit, with each filling port, and with the discharge gate. The control system may further be operative to command the position of each valve to regulate the flow of fluid from each filling port to the discharge gate.

In certain embodiments of the present disclosure, the probe is articulable from a first position wherein a distal end of the probe places the conduit in fluid communication with a body of water overflown by the aircraft, to a second position wherein the aerodynamic drag on the aircraft attributable to the probe is reduced compared to the first position. An actuator may be provided to move the probe between the first and second positions. Optionally, a recess may be provided for receiving the probe in the second position. Further, a door may be provided that covers the probe and the recess when the probe is in the second position.

In still another embodiment of the present disclosure, a baffle is provided internal to the storage tank at least partially defining a first chamber within the tank, the baffle being operative to contain water entering the tank through the filling port, substantially filling the first chamber before filing any other portion of the storage tank. The first chamber may be centered substantially coincident with a center of gravity of the aircraft.

The baffle may include one or more baffles, and be provided substantially vertically, horizontally, parallel with or transverse to a longitudinal axis of the aircraft, or otherwise provided in the storage tank. More complex baffle arrangements may define a second chamber substantially co-centered with the first chamber. A second baffle is positioned and operative to substantially contain within the second chamber water overfilling the first chamber, substantially filling the first and second chambers before filling any other portion of the storage tank. The baffle may form part of an opening at the boundary of the first chamber, that opening operative to regulate the flow of fluid from the first chamber into the remainder of the storage tank.

In certain embodiments of the present disclosure, the storage tank further comprises a vent that is selectively in fluid communication with dynamic air pressure of slipstream air over the aircraft, static air pressure surrounding the aircraft, a source of positive air pressure and a source of negative air pressure.

In some embodiments, a discharge gate is provided in aircraft for discharging fluid carried in the storage tank from the aircraft. A valve selectively places the storage tank in fluid communication with the probe-carried conduit, or the discharge gate.

BRIEF DESCRIPTION OF THE FIGURES

These and other features, aspect, advantages and benefits of the instant disclosure will be made apparent through the following detailed description and attached drawings, wherein like reference numerals refer to like structures across the several views, and wherein.

DETAILED DESCRIPTION

Figure 1:
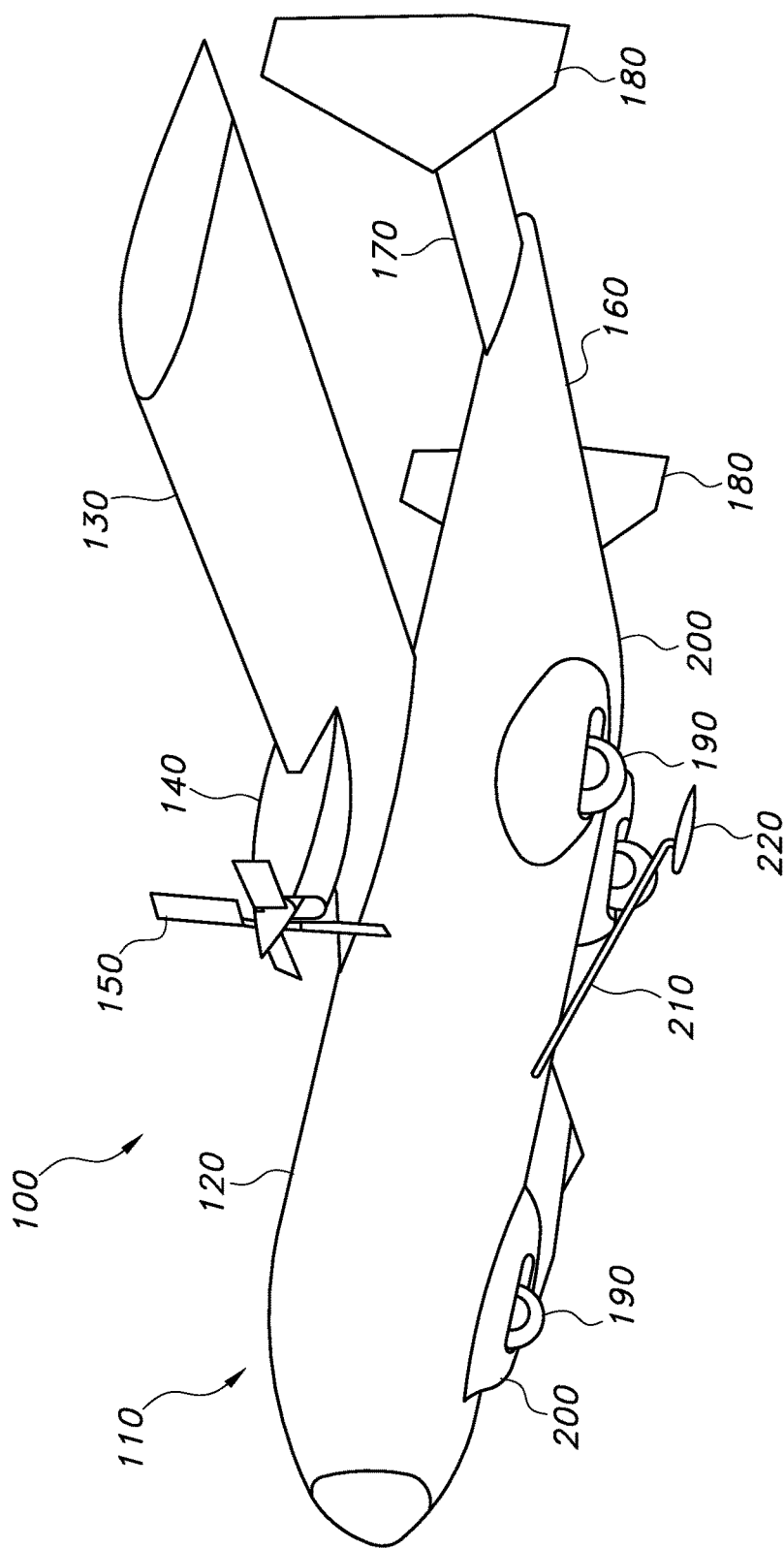
FIG. 1 is a depiction of one embodiment of a firefighting UAS according to a first embodiment of the present disclosure.

Referring now to FIG. 1, illustrated is a depiction of one embodiment of a firefighting UAS, generally 100, according to a first embodiment of the present disclosure. The UAS 100 of the depicted embodiment includes a structurally conventional aircraft 110, having a fuselage 120, a fixed wing 130, wing-mounted engines 140, in one embodiment a turbo-shaft engine, driving a propeller 150, an empennage 160 with horizontal stabilizer 170 and vertical stabilizers 180. Wheel landing gear 190 includes a fairing 200 to reduce aerodynamic drag while avoiding the weight and complexity of retractable landing gear, though in some embodiments retractable gear may be desirable and therefore employed. The present disclosure includes within its scope nearly any aircraft configuration operative to carry a firefighting payload. Such include, without limitation, those having turbojet propulsion rather than or in addition to propeller, single or multiple engine configurations, rotary-wing, lifting body, vectored-thrust arrangements, or the like.

Also depicted in FIG. 1 is a retractable water pickup probe 210, in its deployed, aka extended, position. In the FIG. 1 embodiment, the probe 210 extends from a forward portion of the fuselage 120. It is deployed to a location below the fuselage 120, and is allowed to penetrate the surface of a body of water (river, lake, reservoir, etc.) over which the aircraft 110 is flown. Water is drawn from the body of water through an internal conduit (not shown) in the probe 210, and collected for delivery to a fire. The probe may be provided with a streamlined body 220 at its intake end, in order to reduce drag, such as upon insertion into the water. Alternately or additional, one or more fluid foils (not shown) may be provided to aid in the stability of the probe during water pickup. These foils may optionally be partially or fully articulable.

The probe 210 retracts by pivoting at or near its point of attachment with the fuselage 120, in order to bring the probe 210 flush or nearly so with the fuselage 120. Optionally, the fuselage 120 may be provided with a recess 230 to accommodate the retracted probe 210 for improved streamlining and reduced drag. A fairing analogous to the gear fairing 200 may be provided to improve the drag profile of the retracted probe 210. The probe 210 may be attached elsewhere on the aircraft 110 as may be convenient. The probe in the present embodiment is generally aligned with the longitudinal axis of the aircraft 110, both in general and in that it is attached to the fuselage 120 along the longitudinal axis. Multiple probes 210 may be provided, and as such may be arranged parallel with the longitudinal axis of the aircraft 110, and optionally symmetric with respect to the longitudinal axis of the aircraft 110.

Figure 2:
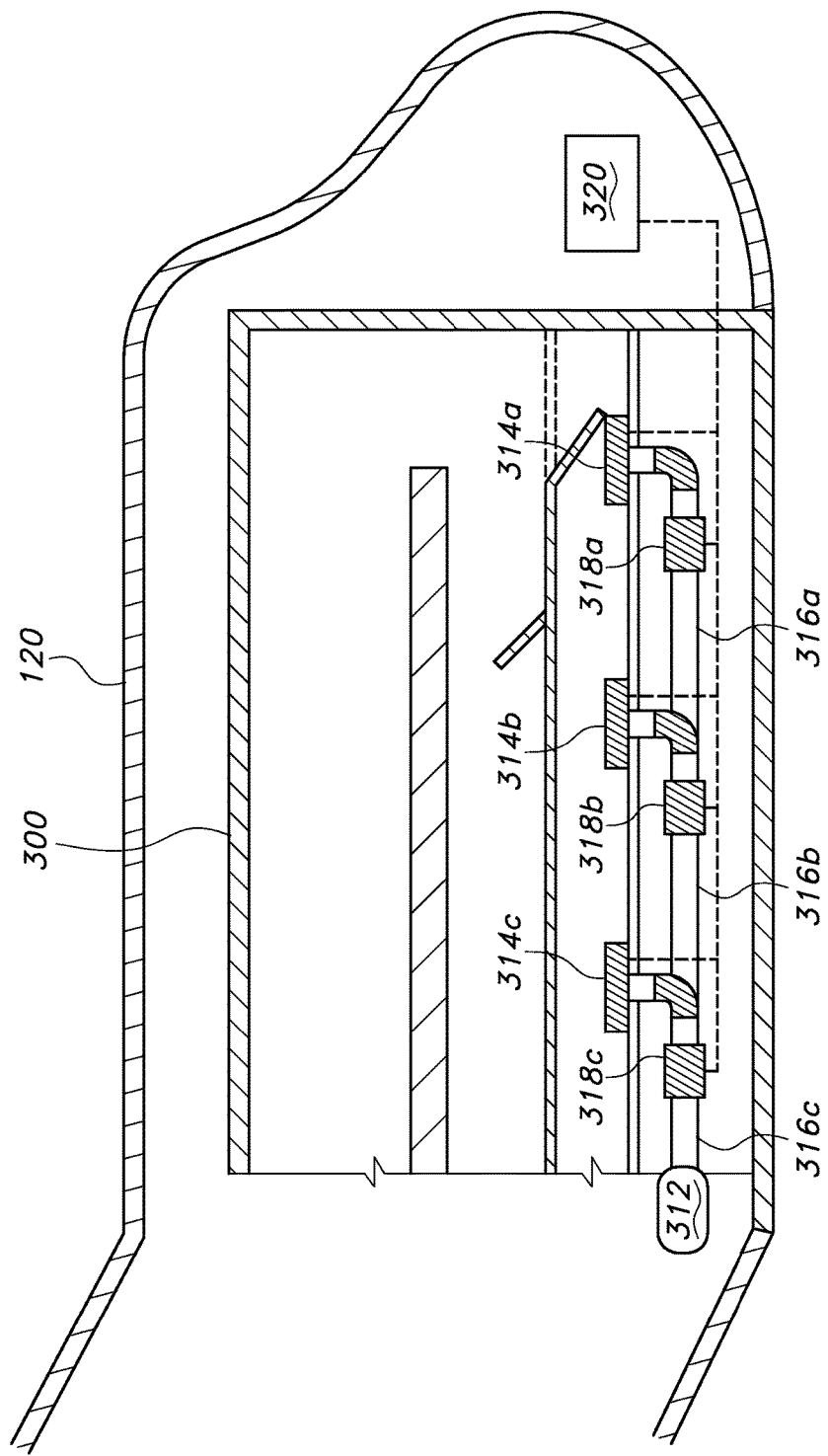
FIG. 2 illustrates a schematic cross-section of the UAS fuselage according to a further embodiment of the present disclosure.

Referring Now to FIG. 2, illustrated schematically is a schematic cross-section of the fuselage 120 according to a further embodiment of the present disclosure. One concern associated with in-flight on-loading of water is to maintain the stability of the aircraft in flight, and to avoid the shifting (sloshing) of stored water in the unpredictably and/or uncontrollably altering the center of gravity (CG) of the aircraft in flight. Exceeding the CG envelope can create an unrecoverable flight attitude situation, particularly in flight just a few feet of the surface of a body of water.

One method of controlling water position is to fill multiple, smaller, discrete tanks. This has the apparent drawback that the combined empty weight of the tanks is increased relative to the water capacity of the system as a whole, thereby decreasing the effective capacity.

Illustrated in FIG. 2 is a water tank 300 and associated filling system 310 carried within the fuselage 120. In the depicted embodiment, the filling system includes a manifold 312. Water is directed towards the holding tank 300 via the manifold 312, for example via probe 210 during an in-flight water pick-up. The holding tank 300 may also be filled while the aircraft is on the ground, either via the manifold 312, through an optional other fill port. In the case of ground-based filling speed is optimal over maintaining stability of the water load.

Considering then in-flight water pick-up, water is directed from the probe 210 to the manifold 312. The intake manifold is in fluid communication with a plurality of valves 314a, 314b, 314c, etc., via a corresponding plurality of conduits 316a, 316b, 316c, respectively. Alternately, the configuration may include on such conduit one on each lateral side of the tank 300, with multiple valves 314a, 314b, 314c, etc., off these common conduits. Each valve 314a, 314b, 314c and/or its respective supply conduit 316a, 316b, 316c, may optionally include an associated flow meter 318a, 318b, 318c, etc. The valves 314a, 314b, 314c, etc. as many as six, though more or fewer may be used, are preferably spaced apart from one another, either longitudinally and or laterally with respect to the aircraft 110. More preferably, valves 314a, 314b, 314c, etc. are symmetrically provided longitudinally and laterally with respect to the tank 300 and/or the aircraft 110. Still further, the aggregate placement of valves 314a, 314b, 314c, etc. are preferably centered on a desired center of gravity of the filling or filled tank 300, or the center of gravity of the aircraft 110. The center of gravity of the tank 300 and of the aircraft 110 may or may not be coincident.

The valves 314a, 314b, 314c, etc., are preferably automatically and remotely controllable, still further preferably are embodied as flow control valves. To facilitate this control, valves 314a, 314b, 314c, etc. and if present, flow meters 318a, 318b, 318c, etc., are in communication with an electronic flow control system 320. The electronic control system operates the valves 314a, 314b, 314c, etc. during filling of the tank 300 to maintain an equal rate of flow through each of the valves 314a, 314b, 314c, etc., and thereby aid in maintaining the stability of the aircraft 110 during the filling operation. Conversely, the electronic flow control system 320 is also operative to monitor and control outflow of water from the tank 300 through the valves 314a, 314b, 314c, etc., again with a goal of maintaining aircraft stability during the emptying of the tank 300.

Each valve 314a, 314b, 314c, etc., channels the water by the way of conduits 316a, 316b, 316c, etc., which discharge toward the aft of the aircraft 110. More or even fewer valves may be used, though preferably the flow of each pipe for every valve is measured as by flow meters 318a, 318b, 318c, etc. Furthermore, the flow through each valve 314a, 314b, 314c, etc., is controlled by opening or closing the valve, the flow control system 320 for doing so being computer-processor controlled so that the flow is continuously balanced from valve to valve, from side to side, and from final discharge conduit left or/and right.

Figure 3:
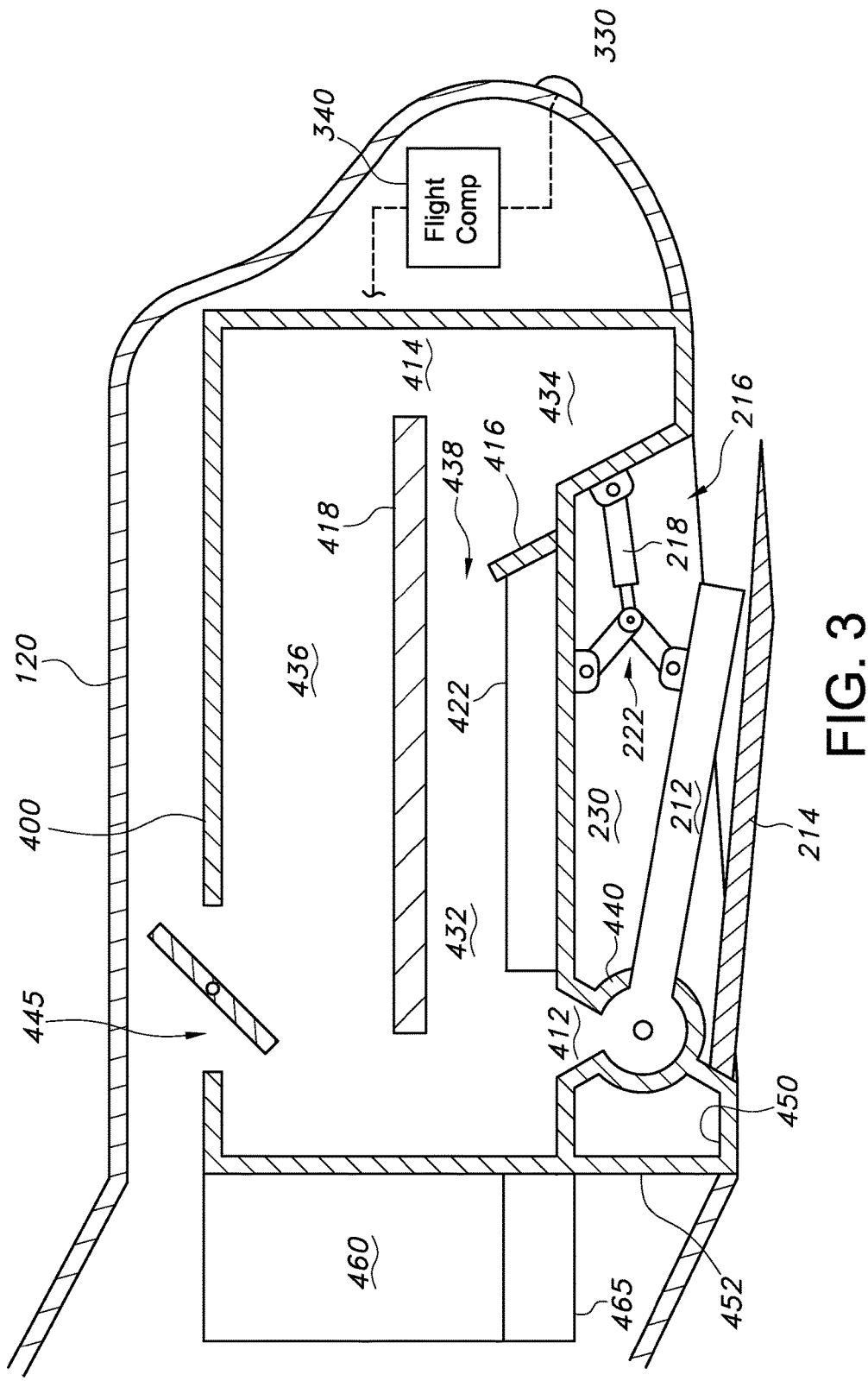
FIG. 3 illustrates a schematic cross-section of the UAS fuselage according to a still another embodiment of the present disclosure.

Turning then to FIG. 3, illustrated schematically is a schematic cross-section of the fuselage 120 according to an alternate embodiment of the present disclosure. According to the embodiment of FIG. 3, water tank 400 is carried within the fuselage 120 of the aircraft 110. In this embodiment, a water intake probe 212 is retractable into a stowed position when not in use (see, FIG. 4). The stowed probe 212 may be enclosed by a door 214. The probe 212 is extended or retracted by operation of an actuator 216, in this particular embodiment comprising one or more a linear actuators 218, being operatively connected with a linkage 222 between the probe 212 and the fuselage 120. Separate and/or rotary linkages may be provided in place of or in addition to linkage 216, and also with respect to the joined or separable opening and retraction of door 214.

According to the embodiment of FIG. 3, during an in-flight water pickup water is directed through an internal conduit (not shown) of the probe 212 to a valve 440. The valve 440 is operative to place the probe 212 in fluid communication with a manifold 412 and/or a discharge port 450. In this embodiment, the manifold 412 is in direct fluid communication with an interior 414 of the water tank 400.

As water fills the tank 400, one or more baffles, e.g., 416, 418, are provided to at least partially contain the water during the filling process. For example, water entering a substantially empty tank 400 tank from manifold 412 is first contained aft of generally vertical baffle 416 in first chamber 432. Additionally, a substantially horizontal baffle 418 will help contain inflow water and minimize any topping of the generally vertical baffle 416.

However, once chamber 432 is full, water will spill over the top of the generally vertical baffle 416, through a restricted opening 438 between it and the substantially horizontal baffle 418, into chamber 434. And water topping baffle 418 at an aft end due at least in part to any flow restriction at 438 will fill chamber 434 from above. Last to be filled is chamber 436, lying above chambers 432, 434, and baffle 418. Baffles 416, 418 may extend the full width of the tank 400. As such they may further provide for additional structural support to the tank 400, and or the fuselage 120 of the aircraft 110.

Generally speaking, longitudinal stability (i.e., aircraft pitch attitude control) is of higher concern as compared to lateral stability. The aircraft 110, its fuselage 120, and as a result the tank 400, are much longer than they are wide. Therefore, lateral shifting of a water load has less impact on the aircraft 110 in general, coupled with the fact that the aircraft in generally designed to have greater stability in roll (i.e., to either side of its longitudinal axis) than it does in pitch.

Notwithstanding, in order to additionally provide for lateral control of filling water, one or more longitudinal baffled 422 may be provided. The tank may be thus divided longitudinally, laterally, or in some combination of both directions (e.g., concentric or opposing chambers centered on the aircraft center of gravity which progressively fill evenly and outward therefrom). The longitudinal baffle 422 contains filling water to the center of the chamber 432. Upon topping the longitudinal baffle 422, the water spreads laterally within the tank interior 414. In this case, longitudinal baffle 422 is lower than baffle 416. Accordingly, inflow water will overtop the longitudinal baffle 422 before topping baffle 416. However, one skilled in the art in light of the instant disclosure may choose to adjust the height of the baffles 416, 422 relative to one another such that they are equal in height or that baffle 422 is higher than 416.

A conduit (not shown) may be provided to place chamber 434, and particularly a bottom thereof, in fluid communication with manifold 412 and/or valve 440 to ensure complete discharge of the water tank 400. This conduit may be formed laterally to either or both sides of the recess 230 for stowing the retracted probe 212.

Discharge of water from the tank 400 is obtained by placing valve 440 in a position to connect the interior 414 of the tank 400 with the discharge port 450. Preferably, an aft-facing hatch 452 is openable in-flight to permit water discharge, whether under the force of gravity, and/or aided by air pressure applied to vent 445, a pump 465, some other means, or any combination.

Optionally, the tank 400 is further provided with an airflow vent 445 to aid in inflow and discharge of water from the tank 400. For example, during water inflow, the vent 445 can be connected with a source of negative air pressure, tending to remove air from the interior 414 of the tank as water enters. The source of negative air pressure may include a vacuum pump and/or a venturi or the like placed in the slipstream of airflow over the exterior of the aircraft 110.

Conversely, during a discharge operation, the vent 445 may be placed in communication with a positive source of air pressure, including without limitation, a fluid pump 465, and/or the dynamic air pressure generated by the slipstream around the aircraft 110 in flight. It may be considered that the source of dynamic ram air pressure is the probe 212 itself, by being opened to the slipstream in flight. In that case, the valve 440 may be configured to simultaneously direct water from the tank 400 to the discharge port 450, while ram air is directed from the probe 212 to the interior 414 of the tank 400, for example by fluid connection (not shown) with the vent 445, or some other portal of entry provided for that purpose.

In still a further embodiment, the aircraft may be provided with a pressurization tank 460. The pressurization tank may be charged with high-pressure air, as by a pump 465, for example, for application to the water tank 400 to aid in its evacuation. Alternately, the pressurization tank 460 may be evacuated of air to provide the aforementioned negative air pressure source to aid in the filling of the tank 400.

Figure 4:
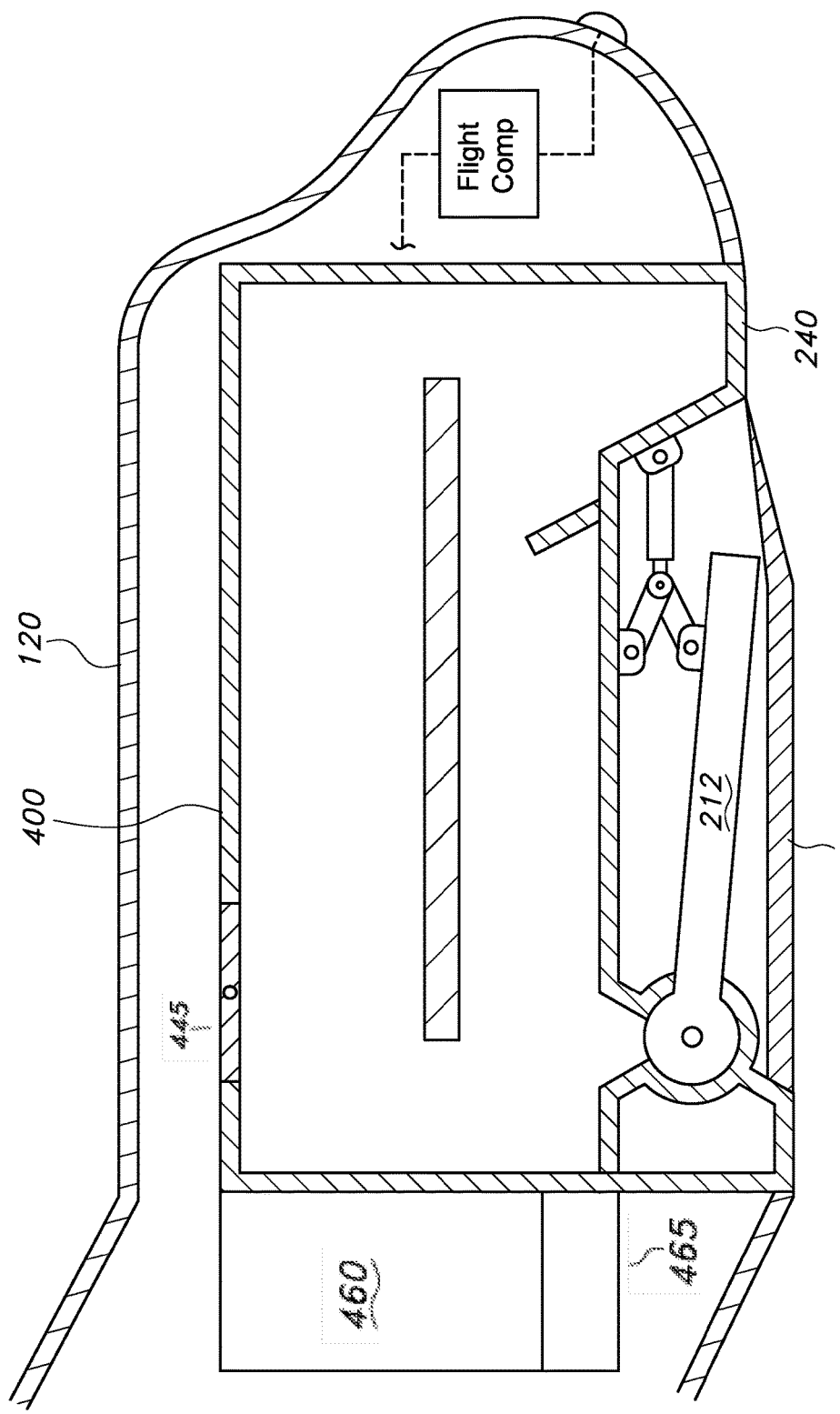
FIG. 4 depicts the embodiment of FIG. 3, showing a pickup prove stowed in a retracted position.

Moreover, the embodiment of FIGS. 3-4 is freely combinable in whole or in part with the features of the embodiment of FIG. 2, for example with regard to the direction and orientation of the water pickup probe 210 and/or 212, valves 314*a*, etc., baffles 416, 418, etc., vent 445, among other features.

Optionally, additional features of aircraft 110 may be provided to make it more robust and suitable to the aerial firefighting application. The undercarriage of the aircraft is optionally protected by heat-, flame- and/or fire-retardant barrier layer 240. Fire-retardant tiles 242 may be used to form all or part of the barrier layer. As a result of having the barrier layer 240, the aircraft 110 could approach the fire at a lower altitude, Furthermore, the barrier layer 240 need be configured to protect the structural integrity of the aircraft 110 alone. The aircraft 110 is generally more tolerant of heat than a human pilot would be. The absence of human pilot(s) onboard the aircraft 110 mean that the aircraft designer need not consider human environmental concerns. As a result, the barrier layer 240 can be made lighter and thinner for a given height of penetration into the fire. Alternately, for an equivalent measure of protection afforded by the barrier layer 240, the UAS aircraft 110 may be permitted to descend lower into the fire for more effective water delivery.

Furthermore, as an optional enhancement, certain embodiments of the aircraft 110 in the presently disclosed UAS 100 may be fitted with one or more infrared sensors 330, in a more particular embodiment one or more directional infrared sensors. These sensors 330 may be used to pinpoint the location of the base of the fire, and communicate the location information to the flight computer 340. The flight computer 340 processes the temperature information derived from the barrier layer 204 together with the location information of the source of the fire from the infrared sensors 330 in order to optimize the position and altitude from which to conduct a water drop.

In all aircraft, including UAS 100, one fundamental tradeoff is fuel against payload. Since the aircraft 110 has a given load carrying capability; more fuel means less load for more range, and vice versa. According to conventional aircraft construction, fuel tanks are carried in within the space of the wings 130.

In the case of the UAS 100 according to the instant disclosure, the fuel carrying system is based on bladders located in the fuselage. While this is possible according to the present disclosure, in a more particular embodiment the wings 130 are not used as fuel tanks according to the conventional construction. Rather, fuel is carried in bladders located in the fuselage 120 of the aircraft 110. Furthermore, carrying fuel bladders in the fuselage 120, the range of available operations becomes very flexible. This is a tremendous advantage because if the fire is close to a source of water you could limit the amount of fuel and thus increase the amount or water, on the other hand if the fire is further out you have ability to adjust and utilize the optimum load of fuel v. water. In one presently considered embodiment, the aircraft may be configured to carry as much maybe as forty tons of water and/or fire-fighting material, in addition to up to ten tons of fuel, using an empty weight of about half the payload.

Figure 5:
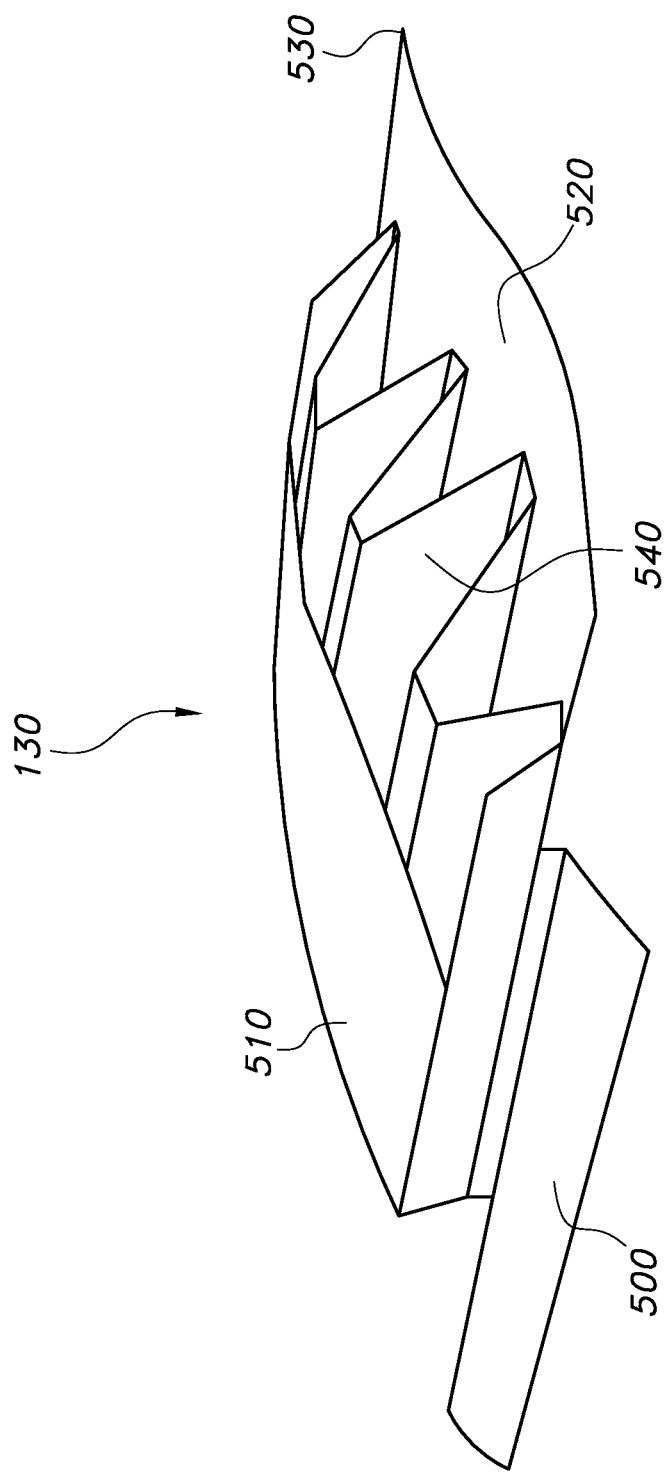
FIG. 5 is an exploded assembly view of the wing 130 construction according to one embodiment of the present disclosure.

Accordingly, the construction and assembly of the wings 130 becomes far more efficient and cost-effective. In this way, structural ribs of the wings 130 are simpler in design, as there is no need for openings therein to allow space for a fuel bladder. Wing ribs are therefore more uniform across the wingspan, also owing to the use of a rectangular planform wing. One exemplary construction of the wing 130 is illustrated in FIG. 5, which is an exploded assembly view. The surface of the wing is defined by a leading edge 500, an upper wetted surface 510, a lower wetted surface 520. Upper and lower wetted surfaces 510, 520 meet at a trailing edge 530, except where a flap or aileron control surface is provided, and in the latter case these nearly meet. Upper and lower wetted surfaces 510, 520 are each secured to the internal spar 540, which in the depicted embodiment is a corrugated structure which cross-section shape generally defines the wing profile. Notwithstanding the above noted preference for storing fuel in the fuselage, the construction described would still allow for fuel cells in the interstitial spaces, if desired. The exemplary shape uses a GA 35A315 section that has a design lift coefficient of 0.3 and a 15% thick loft. The combination is deemed to be nearly ideal for this application providing reasonable lift-to-drag performance in addition to sufficient structural height and good internal volume.

Figure 6:
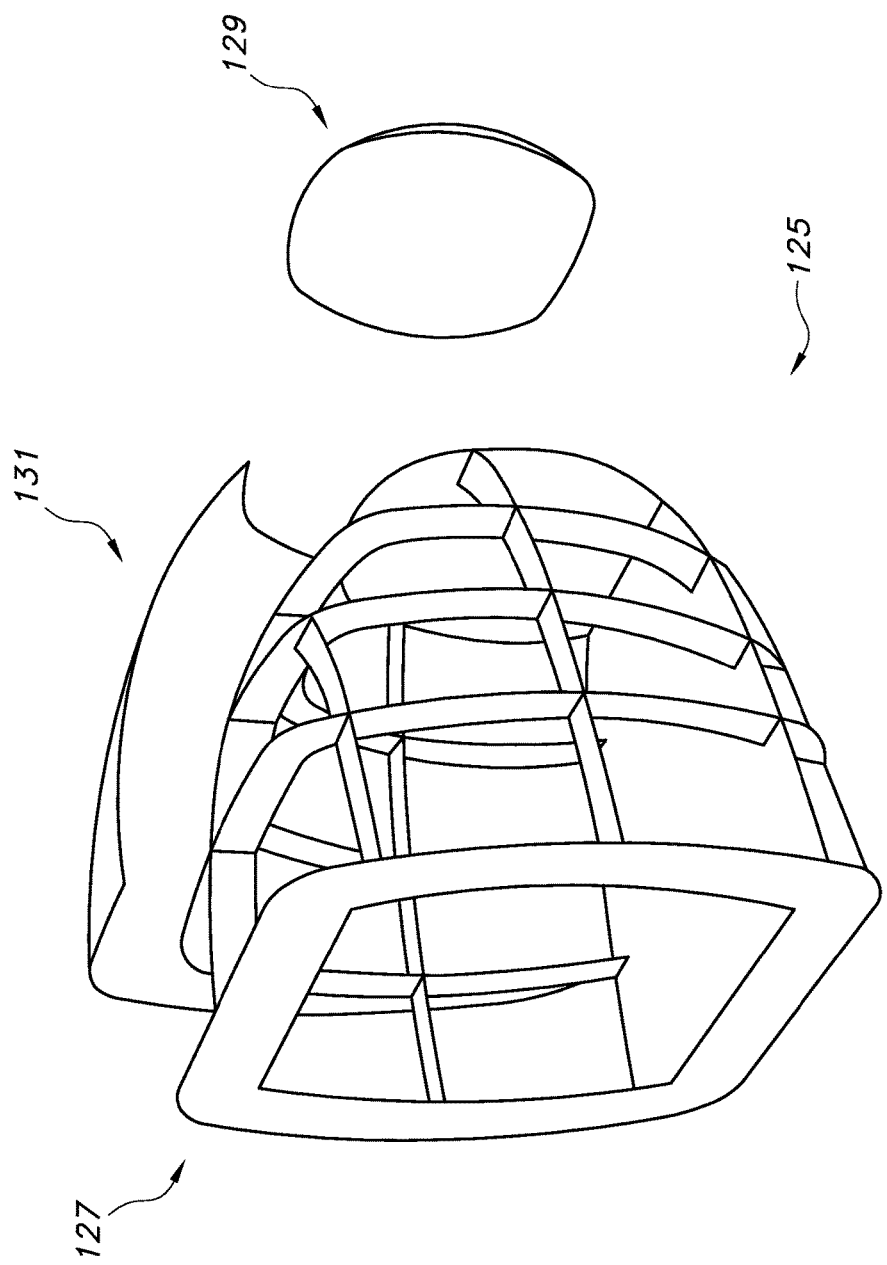
FIG. 6 depicts an exploded assembly view of the nose section of the aircraft according to one embodiment of the present disclosure.

The aircraft 110 is comprised of simple shapes that are suitable for several structural approaches. FIG. 6 depicts a nose section 125 of the aircraft 110 in art exploded assembly view. The nose section 125 is comprised of compound curvatures that can be easily molded, then assembled over a skeleton of preformed and pre-cut sandwich panels arranged in an "egg-crate" framework 127. Assembly work can be done through the use of simple positioning jigs and bonding compounds. Similar simple tooling can be utilized for placing and attaching hardpoints and joining mechanisms, which would then mate to the main portion of the body. The nose dome 129 may be a simple fiberglass laminate, thus allowing the use of radar or other sensing and/or transmitting devices mounted beneath it. A shell 131 in one or more sections would then attach to the remainder of the structure through conventional removable fasteners.

Figure 7:
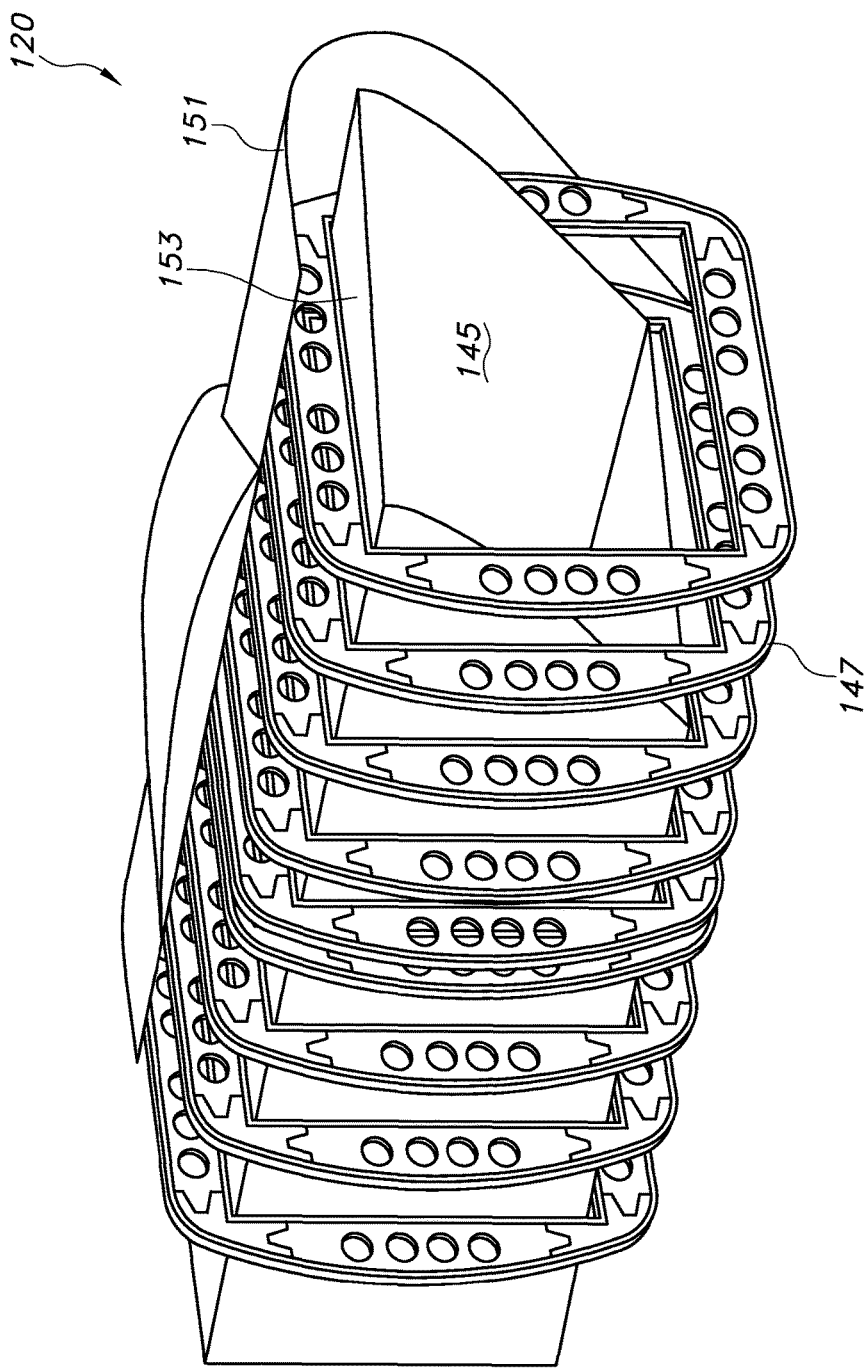
FIG. 7 depicts a portion of the fuselage in cutaway view according to one embodiment of the present disclosure.

FIG. 7 depicts a portion of the fuselage 120 in cutaway view to illustrate some of its structural characteristics. The main body of the fuselage 120 extends aft of the nose section 125 to include the cargo bay 145 and preferably a loading ramp (not shown). The internal shape is based on a simple ten-foot by ten-foot square, while the external shape is only a bit more complex. The top and bottom of the fuselage 120 are substantially flat with radiused corners, while the sides incorporate a slight curvature in order to add shear deflection stability to a load carrying skin.

Figure 8:
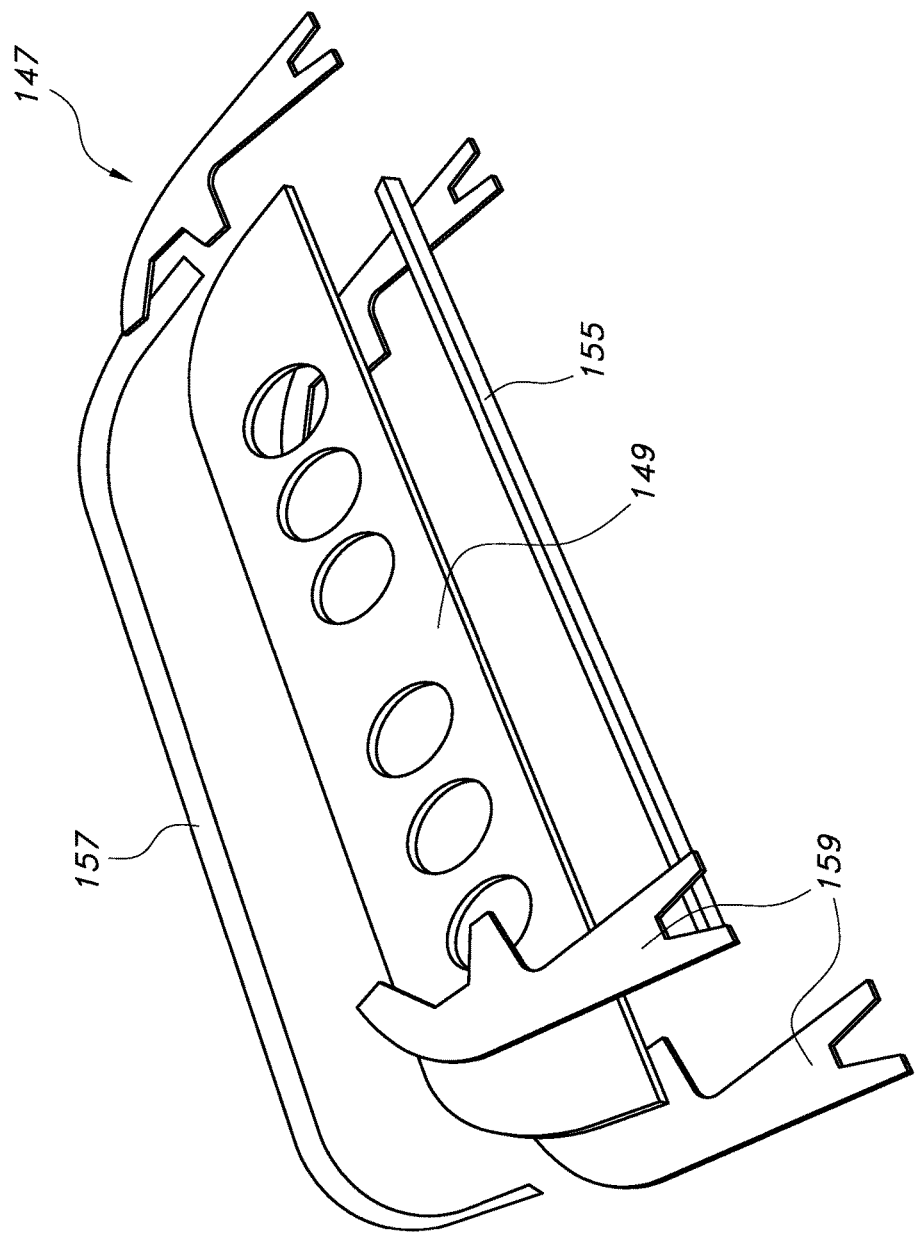
FIG. 8 depicts structural frames of FIG. 7 in a partial exploded detail view according to one embodiment of the present disclosure.

FIG. 8 depicts the structural frames 147 in a partial exploded detail view. The internal structural frames 147 are envisioned to be symmetrical about the centerline top to bottom as well as side-to-side. In this manner the fuselage structure can use identical components for the upper and lower subassemblies, as well as for the left and right ones. The frames consist of the primary shear webs 149, the internal stiffeners 155 that support the cargo bay interior, the external stiffeners 157 that support the outer skin, and the joining corner doublers 159, which connect the subassemblies together.

The frames are then assembled in a similar manner as is mentioned for the nose, section 125, resulting in a simple "egg-crate" framework that is stabilized by longitudinal sub-frames and/or stringers, as necessary for the structural configuration. The outer skin 151 is then joined to the framework's outer stiffeners. The cargo bay skin 153 is non-structural (except in the floor and the tail-cone) and can consist of either sandwich panels or simple plywood.

Figure 9:
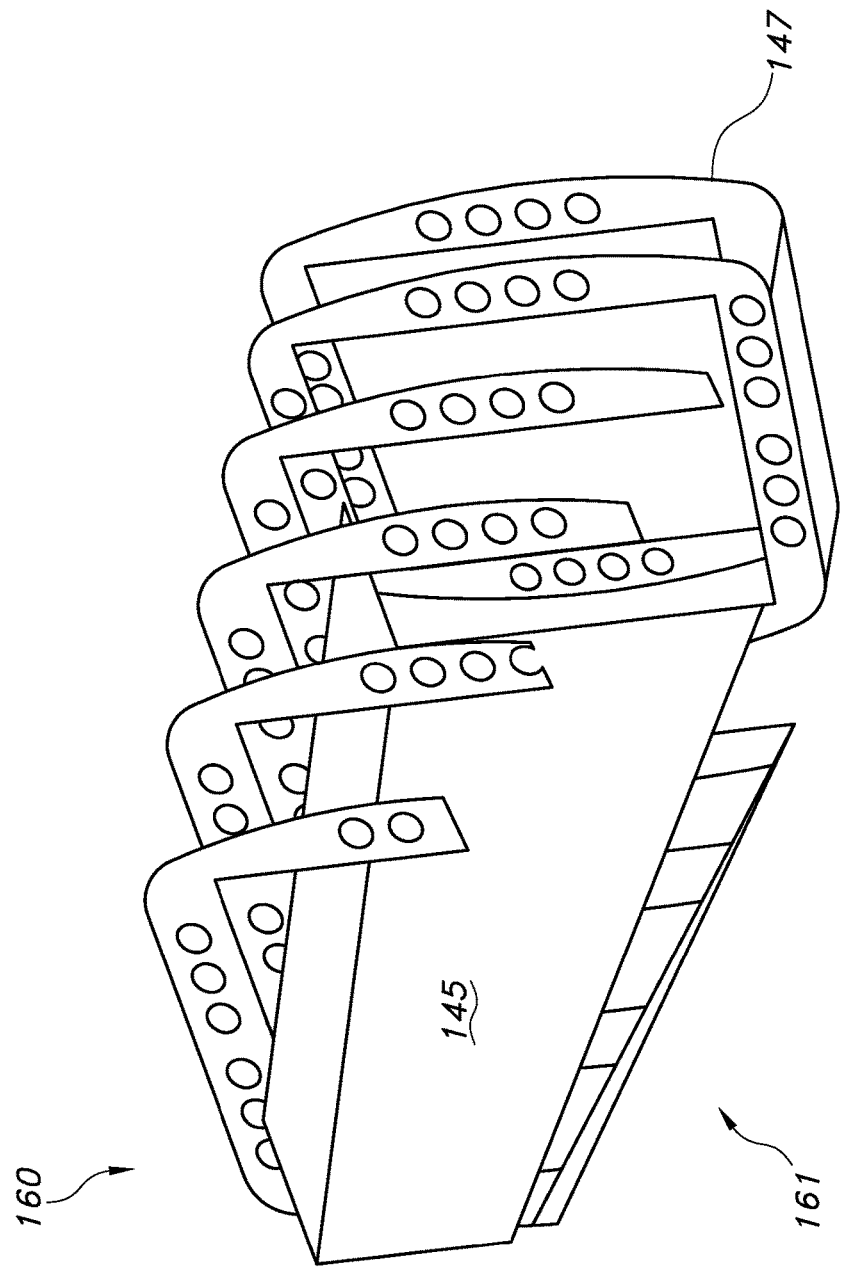
FIG. 9 depicts an aft area of the aircraft in cutaway view according to one embodiment of the present disclosure.

FIG. 9 depicts a ramp area of the aircraft 110, again in cutaway view. The ramp area adjacent the empennage 160 is based upon the same cross section as the rest of the body 120, and thus the same structural components can be used. The only modification that will be required will be on the bottom taper 161, where the fuselage 120 necks up towards the empennage 160. This is a small area that could easily be molded and bonded to the bottom of the frames 147.

The simple loft of the body would allow it to be built out of either conventional aluminum materials or possibly from pre-molded composites. The latter structural concept is attractive due to the lower part count and a reduced assembly time. The body frame webs can be CNC cut from preformed sandwich panels while the inner and outer stiffener and attachment structure can be simple fiberglass pulltrusions. The joining corner doublers can be water-jet cut from pre-made materials of sufficient mechanical properties. The same material can also be used to reinforce areas of concentrated loads such as those encountered in mounting the landing gear and the wings.

The tail cone is again a compound surface and thus can be molded. A similar internal framework to that mentioned above can be added for additional strength and stability, also incorporating hard points for mounting the empennage flight surfaces.

The envisioned materials for the composite concept include fiberglass/aluminum honeycomb sandwich panels for the internal frame webs, fiberglass for the pulltrusion shapes, and a glass/graphite hybrid for the external skins. Hard-point reinforcement can consist of fiberglass laminates, coupled with industry standard potting compounds.

Variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A firefighting aircraft adapted for use in an unmanned aircraft system, the aircraft comprising:
a storage tank for firefighting fluid having a plurality of filling ports spaced from one another in direct fluid communication with said storage tank and a vent to aid inflow and discharge of water from the storage tank;
a probe carrying a conduit in fluid communication with the storage tank, the conduit being operative to receive water from a body of water overflown by the aircraft while the aircraft is in-flight and moving forward,
a filling system for controlling the flow of water to and from the storage tank directly, the filing system comprising a plurality of valves, each of the plurality of valves associated with each filling port and remotely and automatically operable; and
a control system in communication with each valve, and operative to command the position of each valve to regulate the flow of fluid through each filling port, each of the plurality of valves having an equal flow rate during the inflow of water to maintain stability of the aircraft and the plurality of valves having a balanced flow rate during the discharge of water to maintain stability of the aircraft,
wherein the probe is directly attached to the aircraft and extends from a bottom of the aircraft.

2. The firefighting aircraft according to claim 1, further comprising a flow meter associated with each valve operative to measure fluid flow through each valve, wherein each flow meter is in communication with the control system, and provides flow data to the control system, the control system using the flow data from the flow meters to operate the valves and regulate the flow of fluid through each filling port.

3. The firefighting aircraft according to claim 1, wherein the filling ports are spaced from one another along at least one of a longitudinal or lateral axis of the aircraft.

4. The firefighting aircraft according to claim 1, wherein the filling ports are arranged in an array, the array being substantially centered on the center of gravity of the aircraft.

5. The firefighting aircraft according to claim 1, wherein the valves are controllable to regulate a rate of fluid flow there through.

6. The firefighting aircraft according to claim 1, further comprising a discharge gate for discharging fluid carried in the storage tank from the aircraft; and
a manifold in fluid communication with the probe-carried conduit, with each filling port, and with the discharge gate,
wherein the control system is further operative to command the position of each valve to regulate the flow of fluid from each filling port to the discharge gate.

7. The firefighting aircraft according to claim 1, wherein the probe is articulable from a first position wherein a distal end of the probe places the conduit in fluid communication with a body of water overflown by the aircraft, to a second position wherein the aerodynamic drag on the aircraft attributable to the probe is reduced compared to the first position.

8. The firefighting aircraft according to claim 7, further comprising a recess for receiving the probe in the second position.

9. The firefighting aircraft according to claim 8, further comprising a door that covers the probe and the recess when the probe is in the second position.

10. The firefighting aircraft according to claim 7, further comprising an actuator operative to move the probe between the first and second positions.

11. The firefighting aircraft according to claim 1, further comprising a baffle internal to the storage tank at least partially defining a first chamber within the tank, the baffle being operative to contain water entering the tank through the filling port, substantially filling the first chamber before filing any other portion of the storage tank.

* * * * *

UNITED STATES PATENT AND TRADEMARK OFFICE
CERTIFICATE OF CORRECTION

PATENT NO. : 9,840,326 B2
APPLICATION NO. : 13/920593
DATED : December 12, 2017
INVENTOR(S) : John S. Stupakis It is certified that error appears in the above-identified patent and that said Letters Patent is hereby corrected as shown below:

In the Specification

At Column 6, Line 26, reads "...baffled 422 may be..."; should read --...baffles 422 may be...--.

At Column 8, Line 36, reads "..aircraft 110 in art exploded..."; should read --...aircraft 110 in an exploded...--.

Signed and Sealed this
Twenty-fourth Day of April, 2018

Andrei Iancu
*Director of the United States Patent and Trademark Office*